Figure 1:
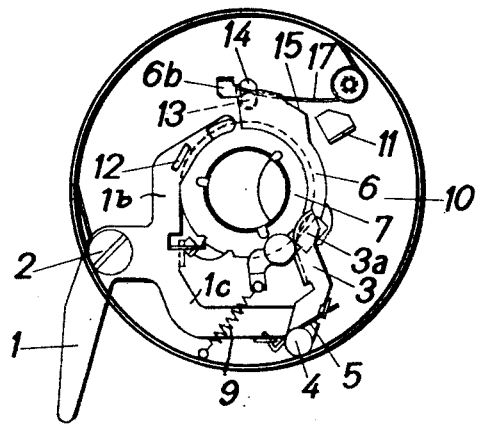

Dec. 17, 1957  W. KADEN ET AL  2,816,494
AUTOMATIC SHUTTER MECHANISM FOR PHOTOGRAPHIC CAMERAS
Filed Sept. 21, 1953  2 Sheets-Sheet 1

INVENTORS
WILLY KADEN and
GEORG MITSCH
By Connolly + Hutz
THEIR ATTORNEYS

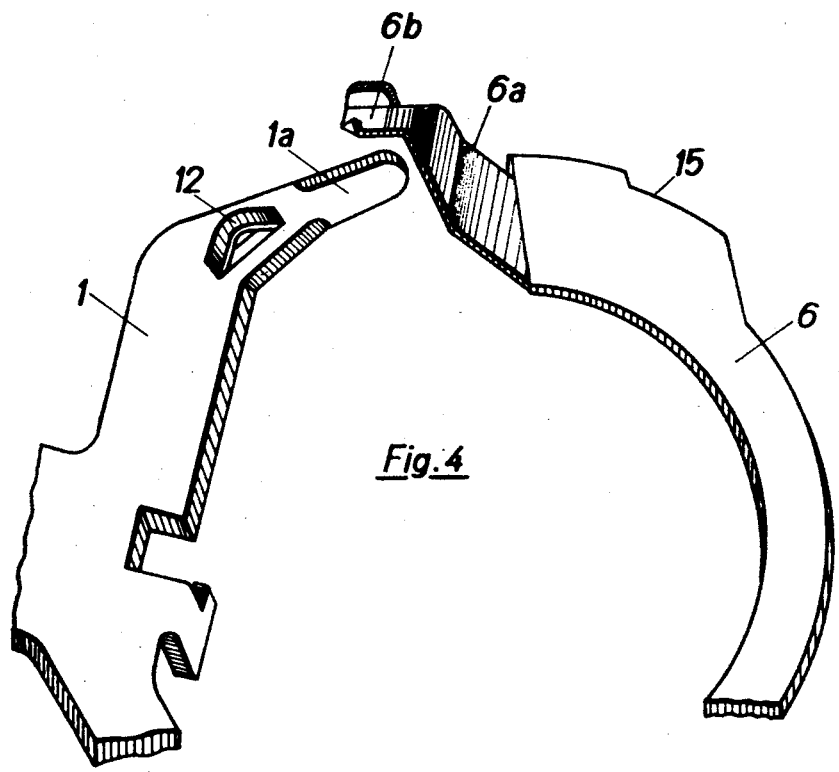

United States Patent Office 2,816,494
Patented Dec. 17, 1957

2,816,494

AUTOMATIC SHUTTER MECHANISM FOR PHOTOGRAPHIC CAMERAS

Willy Kaden and Georg Mitsch, Munich, Germany, assignors to AGFA Camera-werk Aktiengesellschaft, Munich, Germany, a corporation of Germany Application September 21, 1953, Serial No. 381,427

Claims priority, application Germany October 4, 1952

4 Claims. (Cl. 95—62)

This invention relates to photographic cameras and more particularly, to the type employing automatic shutter mechanisms. Specifically, the invention relates to an improved automatic shutter mechanism in which movement of a release lever in one direction first tensions the shutter operating mechanism and subsequently releases a catch to disengage the lever from the system to initiate an automatic shutter opening movement.

Such type automatically operating shutter mechanisms have long been known, but the various type linkage systems employed therein have suffered from a common disadvantage in being susceptible to actuation in an unintended manner. In particular, prior art automatic shutters are so constructed that movement of the release lever under manual actuation tensions the shutter operating system, and moves it into position to actuate the shutter blade opening mechanism upon release of the system. Arrival at this position is accompanied by an audible clicking or snapping due to snapping of a cam on a driving arm in the system in front of a follower pin which opens the blades. This audible indication is often mistaken by the operator to indicate that the release lever has been moved far enough to disengage the catch and release the shutter operating system from the release lever. He forthwith releases the release lever before it is actually disengaged from the system which prevents the independent and free release of the system, which is required in order to provide an accurate exposure period. It will be apparent that this inefficacy is responsible for a large portion of improperly or under-exposed pictures obtained with the camera. It will further be apparent that the exposure time is in effect not truly automatic and not wholly independent of the reflexes of the operator, who, because of the audible indication that the driving lever has snapped into working position, may free the release lever before the shutter operating system is disengaged from it.

This disadvantage is completely obviated, according to the present invention, by so constructing the release lever and the driving arm in combination with the shutter operating linkage system so that any freeing of the release lever prior to its disengagement from the shutter operating system will be incapable of actuating the shutter blades. Preferably, in accordance with the present invention, the blocking against negligent or unintentional shutter opening movement is obtained by providing a disconnectable connection between the conventional shutter blade operating structure and the release lever. The arrangement is such that in cases where the release lever is not completely pressed down far enough to disconnect it from the system, the cam on the driving arm is prevented from contacting the shutter blade opening pin. This prevents opening of the shutter blades upon a freeing of the release lever unless the lever has been fully depressed and released from the system.

It is therefore an object of the present invention to provide an automatic shutter mechanism for photographic cameras in which inadvertent or negligent operation of the conventional shutter release lever is prevented from operating the camera shutter. It is a further object of the present invention to provide an automatic shutter operating mechanism with a linkage system including means blocking actuation of the shutter blades to their opened position until and unless the release lever has been fully depressed far enough to disengage it from the system. It is a still further object of the present invention to provide a shutter operating linkage system in which a simplified arrangement of the component links and levers produces an automatic connecting and disconnecting of the release lever with a shutter blade operating structure. Other and distinct objects will become apparent from the description and claims which follow.

A particular feature of the present invention is the attaining of the above objects by a simplified innovation in the structural arrangement of the component links and levers found in conventional automatic shutter operating mechanisms. In accordance with the present invention, prevention of shutter actuation unless the shutter is free to operate independently is obtained by providing a cam member on an arm of a bifurcated shutter release lever in such manner as to cooperate with the conventional driving arm, lever, or joint, normally carried by the shutter tensioning ring and adapted to actuate the shutter blades to open position by reason of a cam contour contacting a follower element connected to the shutter blades, in such manner that the driving arm or joint is prevented from contacting the cam follower until and unless the release lever is fully depressed. Preferably, the driving arm or joint includes an elastic nose portion immediately in front of the shutter operating cam contour and which is adapted to cooperate with the cam member carried by the bifurcated release lever during a portion of movement of the release lever, so that the driving member and its cam surface are selectively displaced from out of cooperative relationship with the shutter operating cam follower until the actuating mechanism is fully tensioned and released from the release lever by complete depression of the release lever.

Figure 2:
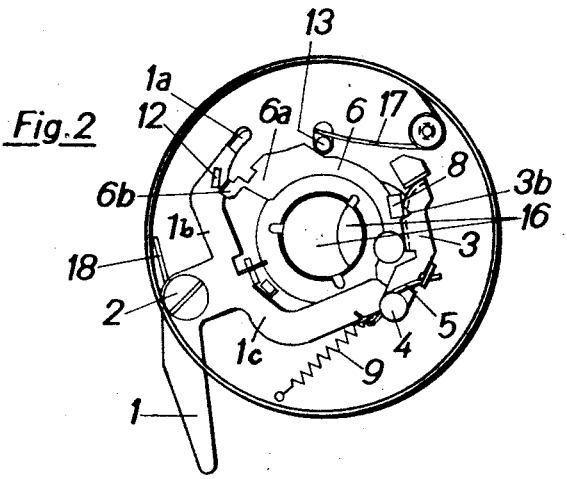
Figure 3:
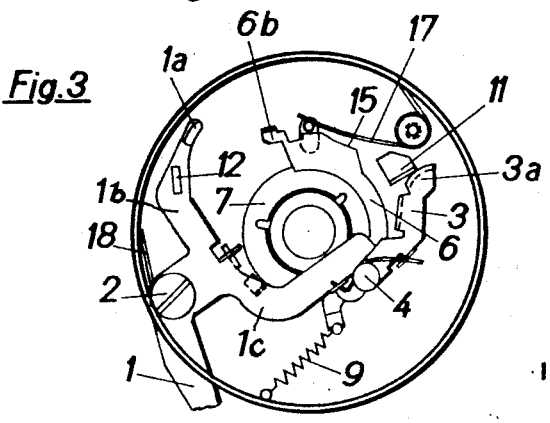

Having broadly disclosed the invention, reference will now be made to the annexed drawings in describing a specific embodiment thereof, and in which:

Fig. 1 illustrates a front elevation view of an automatic shutter mechanism of a photographic camera according to the present invention in its inactive or rest position (non-essential elements being omitted), Fig. 2 is a front elevation view of the automatic shutter mechanism of Fig. 1 illustrating the mechanism after partial depression of the release lever, but before the shutter blades have been opened, Fig. 3 depicts the automatic shutter release mechanism of Fig. 1 after movement of the release lever to its fully depressed position and movement of the shutter blades to the fully open position, and Fig. 4 is an enlarged perspective view of a portion linkage system of the automatic shutter operating mechanism.

As illustrated in Figs. 1 through 3 inclusive of the drawings, the automatic shutter release mechanism according to the present invention comprises a conventional structure including a manually actuatable release lever 1 supported to pivot about a fixed axle 2 and including a pair of bifurcated arms 1b, 1c, a rotatable shutter operating system tensioning ring 7 which is operable to actuate a plurality of shutter blades 16 between an opened and closed position, a cam contoured driving arm, lever, or joint 6, connected with ring 7, and a vertically reciprocable follower arm 13 connected with the shutter blades 16 and adapted to be lifted against a biasing spring 17 by the arm 6. According to the present invention, the bifurcated release lever 1 supports a pivot pin 4 at the extremity of arm 1c upon which is pivotally carried an interruption link or catch 3. The link or catch 3 is normally biased radially inwardly towards the optical axis of the mechanism by reason of a biasing spring 5 connected between arm 1c and the link 3. Spring 5 resiliently forces the curved free end 3a of link 3 against the rear surface of the driving arm or joint 6 carried by the tensioning ring 7. A recessed notch 3b is formed on link or catch 3 immediately behind the curved free end 3a and is normally adapted to catch against a raised lug 8 on lever 6 (see Fig. 2) upon depression of the release lever 1 (i. e., movement of the lever from the position of Fig. 1 to the position of Fig. 2).

The upper surface of the arm of joint 6 is formed as a cam contour 15 which is adapted to bear against follower 13 during a portion of the return movement of ring 7. The follower 13 is normally biased to the lower end of a guide slot 14 by spring 17 where it abuts the side of arm 6. Arm 6 further includes a lateral offset defining a leading portion 6a and an elastic nose portion 6b for a purpose hereinafter apparent. The arm 6, together with the tensioning ring 7 to which it is firmly attached, is normally retained in the initial untensioned shutter closed position of Fig. 1 by means of a spring 9 connected between the casing housing and the arm.

From the above description, it will be appreciated that sequential movement of lever 1 through the positions of Figs. 1 through 3 inclusive would first result in the movement of the interruption link or catch 3 into surface engagement with driving lever 6. During the initial stages of such movement, the link 3 becomes pivoted about its arbor 4 to bring the notch 3b into contact with the driving lug 8 of arm 6 to therewith cause the arm and tension ring 7 to rotate in a counterclockwise direction as the bifurcated arm 1c moves upwardly with depression of lever 1. Without more, this sequence of action would result in a position being reached by the component parts in which the driving arm 6 would have rotated in a counterclockwise direction to such an extent that the cam contour 15 arrives at a predetermined position where it can contact the shutter operating follower arm 13 (see Fig. 2) upon release of the shutter operating system and which movement would normally be accompanied by the disengagement of the twisted nose portion 1a of bifurcated arm 1b from contact with the leading offset portion 6a of lever 6. As a result, driving lever 6 would be freed to snap into position beneath the follower arm 13 with a notable, audible click. This clicking action can occur before the release lever 1 reaches its fully depressed position (see Fig. 3) and even before the interruption link or catch 3 is disengaged from the driving lever 6 by reason of the camming action afforded by the abutment of the curved nose 3a with a fixed stop 11. Under such conditions, and by reason of the audible clicking of lever 6 beneath follower 13, many camera operators assume that the mechanism is in its fully tensioned position and/or that the shutter mechanism has been released, and proceed to let go of lever 1. This premature letting go of lever 1 would then permit the cam surface 15 to raise the follower 13 and therewith to open the shutter 16 even though the mechanism was not disengaged from the drag of the release lever.

However, in accordance with the present invention, such inadvertent or negligent operation is completely obviated by providing an additional lateral cam surface 12 on the bifurcated arm 1b of release lever 1. This cam 12 is adapted to cooperate with the flexible nose portion 6b on the flexible driving arm 6 to positively prevent engaging of the cam surface 15 with the shutter operating follower arm 13 until the interruption link or catch 3 has abutted stop 11 and further movement of the release lever has positioned the interruption link or catch at the point of disengaging notch 3b from lug 8 (slightly beyond the position illustrated in Fig. 2 of the drawings). At this time the leading portion 6a of driving joint 6 has been fully disengaged from the twisted nose portion 1a of lever 1 and the elastic nose portion 6b becomes disengaged from cam 12 to permit the driving lever 6 to snap into position to actuate the follower arm 13. By reason of this arrangement and letting go of lever 1 prior to disengagement of notch 3b from lug 8 will be ineffective to raise the cam follower 13 in the slot 14 since cam 12 will either be engaged with the elastic nose portion 6b, or will become immediately reengaged with such nose portion, to laterally move the driving lever and its cam contour 15 away from follower arm 13. This will prevent actuation of the shutter blades even though spring 9 tends to return the driving arm 6 and tension ring 7 to its initial untensioned position.

Thus, the present arrangement makes it mandatory to completely depress the release lever 1 to substantially the position shown in Fig. 3, so as to fully release the driving arm 6 by disengagement of notch 3b from lug 8 under the camming action of the curved nose 3a on stop 11 whereby arm 6 and tension ring 7 are freely returned under the effect of spring 9 to the position of Fig. 1, and in so returning, move follower pin or arm 13 under the effect of cam contour 15 upwardly in slot 14 to fully open the shutter blades. The blades automatically close as pin 13 drops off cam surface 15 into the notch adjacent offset portion 6a. Subsequent letting go of lever 1 permits spring 18 to return the lever towards its initial untensioned position. This return movement again brings cam 12 into contact with the flexible nose 6b and subsequently brings the twisted end 1a into contact with crank portion 6a to laterally displace cam surface 15 away from follower arm 13. As a result of the above arrangement, the shutter opening and shutter closing movement effected by follower arm 13 is rendered fully automatic and independent of any drag which might result from the premature freeing of the release lever.

As many apparently widely different embodiments of this invention may be made without departing from the spirit and scope hereof, it is to be understood that the above invention is not limited, except as defined in the appended claims.

What is claimed is:

1. An automatic shutter mechanism for a photographic camera comprising movable shutter blades, a rotatable tension ring, a spring connected to said tension ring, a cam follower connected to actuate said shutter blades, resilient means urging said blades and said follower to a shutter-closed position, a manually actuable pivoted release lever including a pair of bifurcated arms extending from the pivot to lie adjacent diametrically opposite sides of said tension ring, a driving arm flexible in a lateral direction normal to the plane of said tension ring and stiff in directions parallel to said plane, said driving arm being mounted at one end thereof upon said tension ring, said driving arm including a cam surface near its free end for contacting said cam follower to open said shutter blades when said tension ring is released, said driving arm including a recess adjacent said cam surface for allowing said follower to snap into said shutter-closed position as soon as said cam surface moves past said follower during the release movement of said tension ring and driving arm, a catch operatively connected near one end of one arm of said release lever, said catch and said tension ring including cooperating projection and indentation means for causing said tension ring to rotate against the force of said spring in response to movement of said lever, said rotation of said tension ring advancing said driving arm to a predetermined position in which said cam is positioned to actuate said cam follower upon release of said tension ring, a projection disposed in the path of movement of said catch for disengaging said release lever from said tension ring and permitting said ring and said driving arm to rotate back to their untensioned position after movement of said driving arm to said predetermined position, a lateral cam means mounted near the end of the other arm of said release lever and contacting the free end of said driving arm to displace it laterally away from said cam follower while said driving arm is moving from its untensioned position substantially up to said predetermined position, and said lateral cam being constructed and arranged to move out of contact with said driving arm when said driving arm is moved to and past said predetermined position to allow said driving arm cam surface to momentarily contact said cam follower to open and close said shutter blades when said release lever is disengaged from said tension ring.

2. An automatic shutter mechanism as set forth in claim 1 wherein said other arm of said release lever including said lateral cam means is comprised of a slightly twisted end for initially contacting the leading portion of the free end of said driving arm, and said other arm also includes a projection disposed a short distance from said twisted end for imparting said lateral movement to said driving arm.

3. An automatic shutter mechanism as set forth in claim 1 wherein said driving arm includes a wider portion providing said shutter operating cam surface and a narrower free end, and said free end being offset laterally from said wider end to provide a leading portion which can be engaged by said other arm of said release lever.

4. An automatic shutter mechanism as set forth in claim 1 wherein said driving arm is connected to said tension ring at the end of a relatively long and narrow flexible extension of said driving arm, and said driving arm increasing in width therefrom to a portion of maximum width at said cam surface and then abruptly narrows to provide said recess.

References Cited in the file of this patent

UNITED STATES PATENTS

| | | |
|---|---|---|
| 1,831,791 | Mihalyi | Nov. 10, 1931 |
| 1,941,292 | Deckel et al. | Dec. 26, 1933 |
| 2,295,812 | Strassenburg | Sept. 15, 1942 |
| 2,475,952 | Fuerst | July 12, 1949 |